United States Patent

[11] 3,596,742

| [72] | Inventor | Stephen J. Zierak |
| | | Westwood, Mass. |
| [21] | Appl. No. | 876,862 |
| [22] | Filed | Nov. 14, 1969 |
| [45] | Patented | Aug. 3, 1971 |
| [73] | Assignee | Metal Bellows Corporation |
| | | Sharon, Mass. |

[54] CLUTCH AND BRAKE FLUIDIC CONTROL SYSTEM THEREFOR
5 Claims, 1 Drawing Fig.

[52] U.S. Cl. .................................................. 192/14,
137/81.5, 192/18 A, 192/85 A, 192/88 A, 192/91 A
[51] Int. Cl. ............................................... F16d 67/04,
F15c 1/14

[50] Field of Search ........................................... 192/14, 18
A, 12 C, 88 A, 85 A, 91 A; 137/81.5

[56] References Cited
UNITED STATES PATENTS

| 3,182,686 | 5/1965 | Zilberfarb | 137/81.5 X |
| 3,233,522 | 2/1966 | Stern | 137/81.5 X |
| 3,306,412 | 2/1967 | Fisher | 192/88 A X |
| 3,443,575 | 5/1969 | Hughes | 137/81.5 |
| 3,454,045 | 7/1969 | Kaemmer | 137/81.5 X |

Primary Examiner—Allan D. Hermann
Attorney—Cesari and McKenna

ABSTRACT: A bellows-operated clutch is actuated by a sharp pulse from a fluidic digital amplifier. The amplifier is controlled, in turn, by a fluidic gate which can be pulsed on and off very rapidly.

PATENTED AUG 3 1971 3,596,742
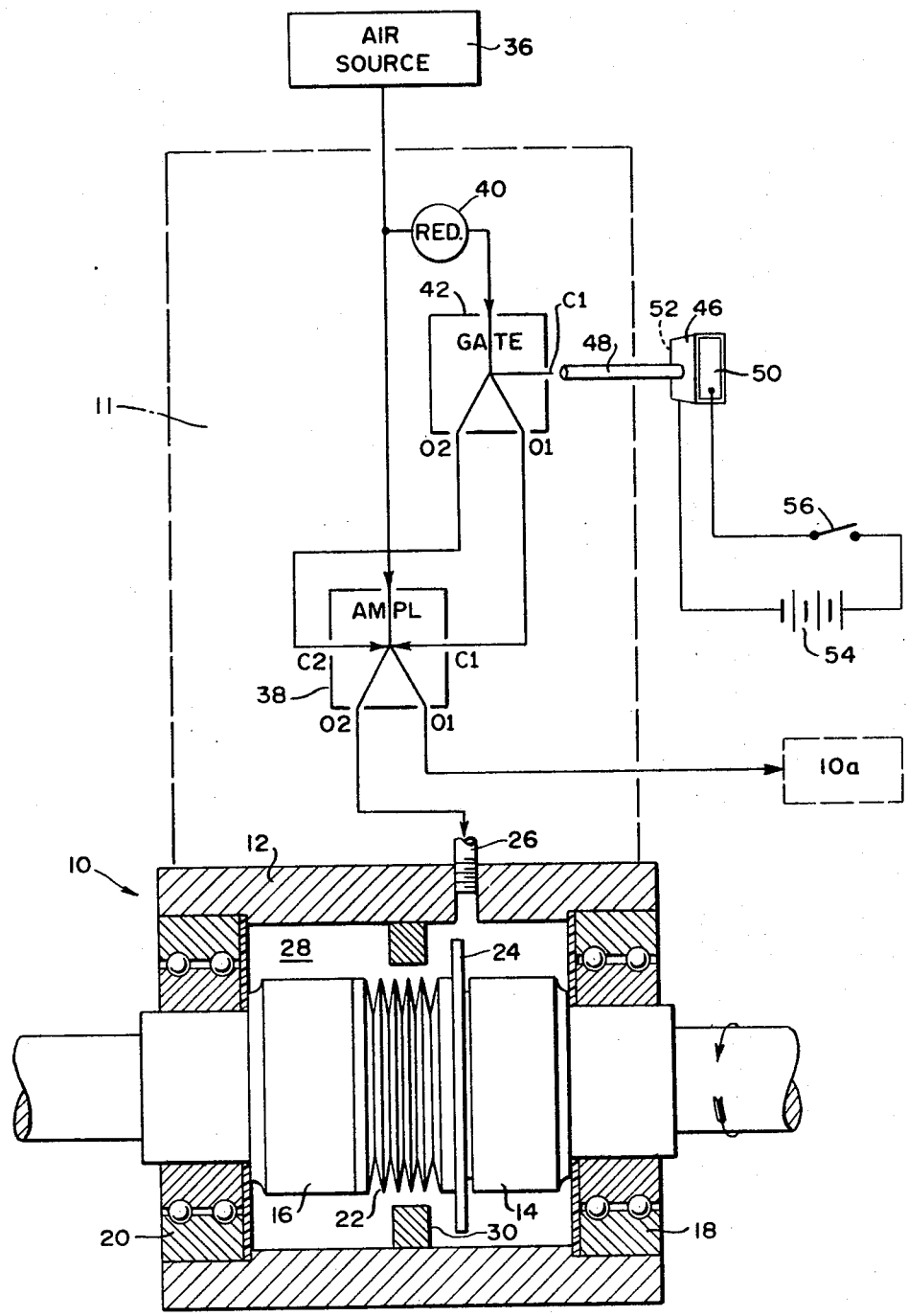
INVENTOR
STEPHEN J. ZIERAK
BY Blair Cesari + St. Onge
ATTORNEYS

CLUTCH AND BRAKE FLUIDIC CONTROL SYSTEM THEREFOR

BACKGROUND OF THE INVENTION

This invention relates to a pneumatic clutch. It relates more particularly to a clutch of this type which responds very quickly to operator control signals.

Pneumatic clutches are used in many applications where it is desired to controllably couple input and output rotary shafts. Present day clutches of this type are satisfactory in many situations where speed of response is not the prime concern. However, most are not entirely satisfactory for use in computer-operated, high-speed printers, process control systems and the like which require extremely fast response to changing input conditions.

The slow response of these conventional clutches is due primarily to two factors: first, the design of the clutch itself is not conducive to quick reaction; and secondly, the fluid for actuating the clutch is not applied in a way to optimize clutch performance. For these reasons, the prior pneumatic clutches and brakes have not seen wide use in applications demanding fast response. There are some clutches available which do respond fairly quickly, however, they tend to be rather elaborate, expensive and difficult to make and maintain. Consequently, they are also impractical for use in high-speed, low-cost control systems.

SUMMARY OF THE INVENTION

Accordingly, this invention aims to provide a relatively low-cost pneumatic clutch and brake which has a relatively fast response time.

Another object of the invention is to provide a clutch which is particularly suitable as a controllable torque transmitter in high-speed systems.

Another object of the invention is to provide a rugged, reliable, pneumatic clutch and brake which responds quickly and precisely to changing input conditions.

Still another object of the invention is to provide a high-speed pneumatic clutch and brake which is relatively small and lightweight and capable of being used in compact pneumatic systems.

Other objects will in part be obvious and will in part appear hereinafter. The invention accordingly comprises the features of construction, combination of elements, and arrangement of parts which will be exemplified in the construction hereinafter set forth and the scope of the invention will be indicated in the claims.

Briefly, the pneumatic clutch comprises a generally cylindrical housing containing a rotary driving member and a rotary driven member arranged coaxially. A friction plate is connected by means of bellows to the driven member and is biased by the bellows toward the driving member so that when the driving member is rotated, the torque is coupled by way of the friction plate and bellows to the driven member so that the two members rotate in unison.

The clutch is disengaged by sharp, fluid pulses from a fluidic control section which are applied to the housing cavity containing the bellows. Each such pulse collapses the bellows so that the friction plate is pulled away from the driving member, with the result that the driving and driven members are free to rotate independently.

The fluidic control section comprises a fluidic gate which can be switched on and off by a piezoelectric transducer mounted at a control input of the gate. The output of the gate drives a fluidic digital amplifier and the pneumatic output of the amplifier is, in turn, fed to the clutch housing cavity.

Normally, the friction plate of the clutch engages the driving member so that the driving and driven members rotate in unison. To decouple the clutch, the operator pulses the transducer which triggers the fluidic gate so that a sharp pulse of fluid is applied by way of the fluidic amplifier to the clutch. This pulse instantly collapses the bellows so that the friction plate pulls away from the driving member very quickly and with a minimum amount of drag.

Utilization of fluidic circuit components in lieu of the conventional solenoid-operated valves to control the clutch improves the reliability and response of the clutch. As a result, the present clutch can be actuated in as little time as 10 milliseconds, as compared with the 75 milliseconds response time of conventional pneumatic clutches of this type.

Additionally, the present clutch is rugged and durable as are its fluidic control elements which have no moving parts and which are themselves small, compact, rugged and reliable.

BRIEF DESCRIPTION OF THE DRAWING

The drawing FIGURE is a partly schematic and partly diagrammatic view showing a high-speed clutch embodying the principles of this invention.

DESCRIPTION OF THE PREFERRED EMBODIMENT

The pneumatic clutch indicated generally at 10 is controlled by a built-in fluidic control section 11. Clutch 10 has a generally cylindrical housing 12 containing a driving member 14 and a driven member 16 rotatively mounted via bearings 18 and 20 at the opposite ends of the housing. A bellows 22 has one end connected to driven member 16 and its other end is secured to a friction plate 24 disposed opposite driving member 14. The spring rate of bellows 22 is such that the bellows normally biases plate 24 into frictional engagement with driving member 14. Consequently, normally when the driving member 14 is rotated, torque is coupled by way of plate 24 and bellows 22 to the driven member 16 with the result that the two members rotate in unison.

A passage 26 is formed in the wall of housing 12 adjacent bellows 22 so that fluid under pressure can be introduced into the cavity 28 containing the bellows. Otherwise, this cavity is relatively fluidtight. When air under pressure from control section 11 is applied to cavity 28, bellows 22 collapses, thereby drawing friction plate 24 away from driving member 14 so that the driving and driven members are free to rotate independently.

Also, in the illustrated embodiment, when the driven member is decoupled from driving member 14, it is also braked to a stop. More particularly, housing 12 includes an interior annulus 30 adjacent to edge of plate 24 on the opposite side thereof from driving member 14. When plate 24 is pulled away from driving member 14 by bellows 22, it is also drawn into engagement with annulus 30. As soon as plate 24 engages annulus 30, the rotation of driven member 16 ceases.

When control section 11 releases the air from cavity 28, the biasing action of bellows 22 again reestablishes contact between plate 24 and driving member 14 so that the driving and driven members are again coupled together.

The operation of clutch 10 is described in more detail in U.S. Pat. No. 3,556,272.

The fluid control section 11 comprises a source 36 of air under pressure, typically 15—30 p.s.i. This air supplies a fluidic digital amplifier 38. It is also applied by way of a pressure reducer 40 to the supply input of fluidic gate 42. The pressure of the air at gate 42 is typically on the order of 5 to 15 p.s.i.

(The symbols for amplifier 38 and gate 42 are the standard graphic symbols developed by the National Fluid Power Association.)

One outlet 01 of gate 42 is applied to the control inlet $C_1$ of amplifier 38. The other outlet 02 of gate 42 is applied to the control inlet $C_2$ of amplifier 38. On the other hand, one outlet 02 of amplifier 38 is fed to passage 26 in clutch 10. The other outlet 01 is vented to the atmosphere or may, if desired, be used to control another clutch 10a identical to clutch 10.

The actuation of gate 42 is controlled by means of a piezoelectric transducer 46 mounted opposite the end of a tube 48 connecting with a control inlet $C_1$ of gate 42. The opposite electroded faces 50 and 52 of transducer 46 are electrically connected to a source of DC voltage indicated by a battery 54. Also, a switch 56 is included in circuit with the transducer 46 and battery 54.

Normally, due to the shape of the orifices through gate 42, the air from pressure reducer 40 exits the gate through its outlet 02. As long as the tube 48 is open, the air from regulator 42 is applied to the control inlet $C_2$ of amplifier 38. So long as this condition persists, the high-pressure air from source 36 exits amplifier 38 through its outlet 01 and is vented to the atmosphere, or applied to another clutch 10a similar to clutch 10, as shown.

In order to decouple clutch 10, the operator closes switch 56. This applies a DC potential across transducer 46 which causes it to expand and close the end of vent tube 48. This closes the control inlet $C_1$ of gate 42, thereby causing the air from regulator 40 to switch to the gate 42 outlet 01. Fluid is now fed to the control input $C_1$ of amplifier 38, causing the air from source 36 to switch to the amplifier 38 outlet 02 leading to clutch 10.

The switching of the high-pressure airstream in amplifier 38 takes place extremely quickly so that the air is applied to cavity 28 in clutch 10 in the form of a very sharp high-amplitude pneumatic pulse. This pulse collapses bellows 22 very suddenly, thereby retracting plate 24 from driving member 14 in a minimum amount of time so that there is a minimum amount of drag between those two members.

Also, in the illustrated embodiment, plate 24 is braked to a stop at the same moment so that driven member 16 is held fast in the angular position it is in at the time. This prompt response of clutch 10 assures that the shaft which is rotated by driven member 16 stops immediately upon actuation of switch 56.

When the operator wants to recouple the driving and driven members 14 and 16, he simply opens switch 56 and deenergizes the transducer 46. The transducer thereupon retracts away from the end tube 48 so that the air from reducer 40 again switches to the gate 42 outlet 02 so that the controlling air is reapplied to the inlet $C_2$ of amplifier 38 and the high-pressure fluid is switched from the amplifier 38 outlet 02 leading to the clutch. The air in cavity 28 immediately vents through passage 26 and the amplifier 38 vent. Thereupon, the bellows 22 quickly returns plate 24 into frictional engagement with driving member 14 so that members 14 and 16 again rotate together.

In practice, amplifier 38, gate 42 and their connections are built right into the housing 12 as indicated in the drawing, in order to minimize the length of the connections. This is desirable because the volume of the connections affects the response time of the clutch (or brake). Therefore, an integral arrangement is important from a performance standpoint, as well as to minimize the size of the clutch package.

It will be understood that the present fluidic control system is equally applicable to control a pneumatic brake system as well as to control other types of bellows clutches, such as the internally pressurized variety which are normally disengaged. Also, other means may be employed to control gate 42.

Thus, as seen from the foregoing, the present clutch (and brake) is a very rugged, durable device which will withstand prolonged periods of use without requiring maintenance. The clutch design coupled with its novel fluidic control section enables the device to respond very quickly and accurately to changing input conditions.

It will also be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described.

I claim:

1. A high-speed clutch comprising
   A. a housing,
   B. a driving member rotatively mounted in the housing,
   C. a driven member rotatively mounted in the housing,
   D. a bellows having one end connected to one of the driving and driven members,
   E. a friction plate affixed to the free end of the bellows and disposed opposite the other of the driving and driven members, said bellows being arranged so that it biases the plate into frictional engagement with the other member so that the driving and driven members are rotatively coupled together,
   F. a passage for conducting fluid under pressure into the housing cavity containing the bellows so as to collapse the bellows and retract the friction plate from the other member so that the driving and driven members rotate independently, and
   G. a fluidic control section including
      1. a fluidic amplifier having an outlet connected to the passage,
      2. a fluidic gate having its outlets connected to the control inlets of said amplifier,
      3. means for connecting the supply inlets of the amplifier and gate to a source of fluid under pressure, and
   H. means at a control port of the gate for switching the gate so that the output of the amplifier is switched to the passage and a sharp pulse of fluid is applied from the source directly to the clutch cavity whereby the friction plate is retracted from the other member very quickly and with a minimum amount of drag.

2. A high-speed clutch as defined in claim 1 wherein said switching means comprises
   A. a piezoelectric transducer arranged opposite a control port in said gate, and
   B. means for applying a voltage across the transducer so that it expands and closes the port.

3. A high-speed clutch as defined in claim 1 wherein said clutch housing has a reduced diameter surface portion positioned adjacent the bellows directly opposite the friction plate so that when the plate is retracted from said other member, it is brought into frictional engagement with the surface portion, thereby stopping the one member.

4. A clutch or brake of the type having a housing and a bellows in the housing arranged to couple torque between two members in the housing when subjected to a first pressure and to decouple the two members when subjected to a second pressure, the improvement comprising
   A. a fluidic control section integral with the housing, said control section including
      1. a fluidic amplifier having an outlet leading into the housing,
      2. a fluidic gate having outlets connected to the control inlets of the amplifier, and
      3. means for connecting the supply inlets of the amplifier and gate to a source of fluid under pressure, and
   B. further including means at a control port of the gate for switching the gate so that the output of the amplifier is fed to the clutch housing in the form of a sharp fluid pulse of relatively large amplitude which quickly changes the pressure to which the bellows is subjected.

5. A clutch or brake as defined in claim 4 wherein the switching means comprises a piezoelectric transducer which regulates fluid flow at the control port of the gate.